United States Patent [19]
Chu

[11] Patent Number: 5,928,600
[45] Date of Patent: Jul. 27, 1999

[54] MANUFACTURING METHOD OF A CONTAINER FORMED INTEGRALLY

[75] Inventor: Hui-Ying Chu, Tainan Hsien, Taiwan

[73] Assignee: Chiun Pao Enterprise Co., Ltd., Tainan Hsien, Taiwan

[21] Appl. No.: 08/906,100

[22] Filed: Aug. 5, 1997

Related U.S. Application Data

[63] Continuation-in-part of application No. 08/559,990, Nov. 17, 1995, abandoned.

[51] Int. Cl.⁶ .............................. B29C 45/00; B29D 22/00
[52] U.S. Cl. ................................................ 264/572
[58] Field of Search ............................................. 264/572

[56] References Cited

FOREIGN PATENT DOCUMENTS

WO 94/08773  4/1994  WIPO ..................................... 264/572

*Primary Examiner*—Leo B. Tentoni
*Attorney, Agent, or Firm*—Rosenberg, Klein & Bilker

[57] ABSTRACT

A manufacturing method of a container formed integrally includes steps of preparing a mold, forming a gas shooting hole, injecting material in the mold for forming a container, shooting gas in the mold for forming an inner hollow layer, opening the mold and taking out a shaped container, and sealing a gas hole. The manufacturing method reduces time needed in forming a container in the mold, enhancing quality of containers produced, by inertia gas shot in material for a container injected in the mold.

7 Claims, 8 Drawing Sheets

MANUFACTURING METHOD OF A CONTAINER FORMED INTEGRALLY

RELATED U.S. APPLICATION DATA

Continuation-in-Part of U.S. Ser. No. 08/559,990, filed Nov. 17, 1995, now abandoned.

BACKGROUND OF THE INVENTION

This invention concerns a manufacturing method of a container formed integrally, particularly a cooling cup having an interior hollow chamber formed between an outer layer and an inner layer and filled with a colored liquid to beautify the container.

Figure 10:
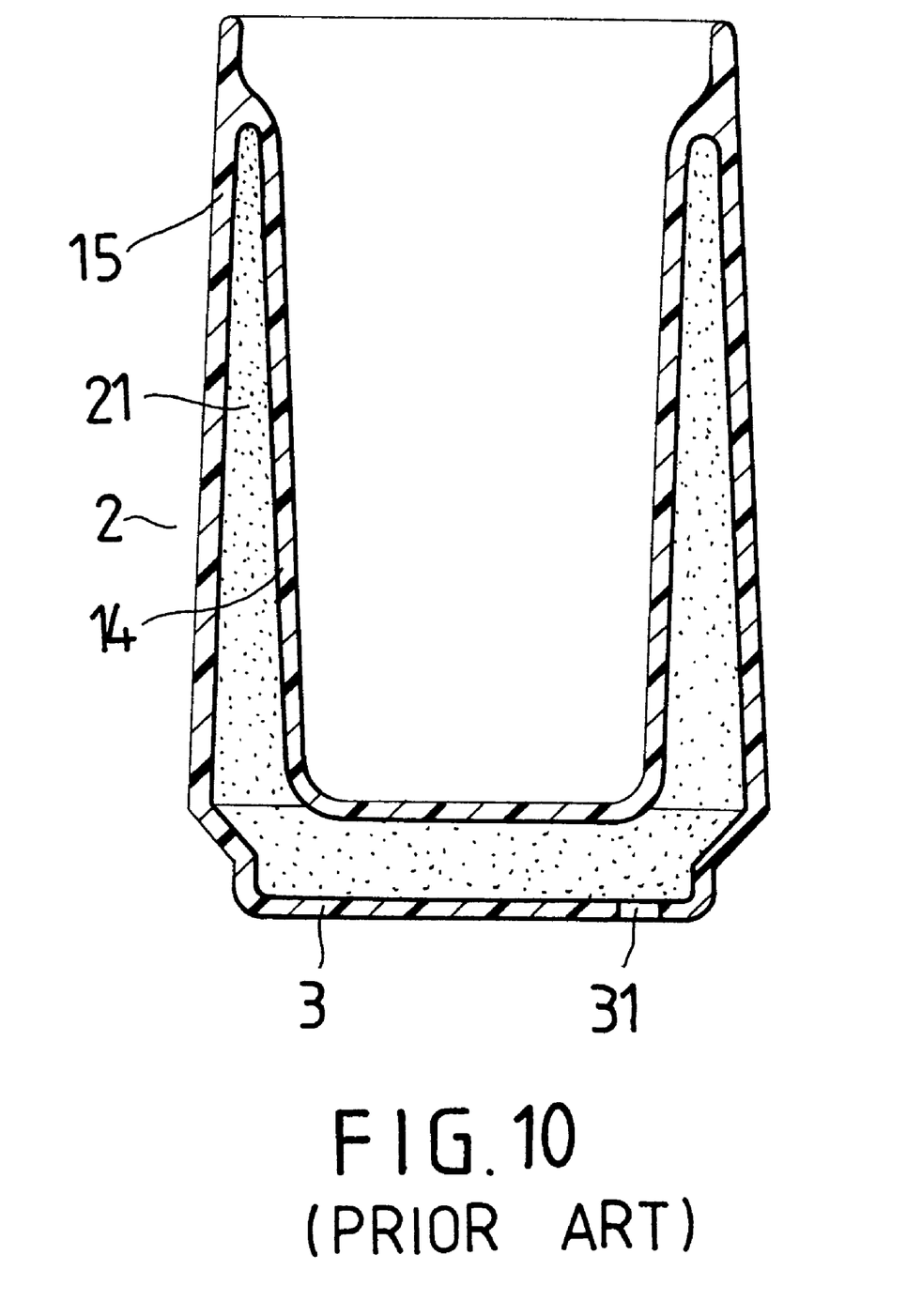
FIG. 10 is a cross-sectional view of a conventional container.

A conventional cooling cup shown in FIG. 10 includes a body 2, a hollow chamber 21 formed between an outer layer and an inner layer, and an injecting hole 31 formed in a bottom 3 of the outer layer and sealed up after colored liquid or a decorative matter is injecting in the hollow chamber 21. Then the outer surface of the body is printed with golden letters or a picture or a design. But consumers may not be satisfied with such features.

SUMMARY OF THE INVENTION

The purpose of the invention is to offer a manufacturing method of a preset container. The container is formed integrally, needing no other process of adding a bottom to a body as a conventional container needs.

One feature of the invention is an inertia gas shot in hot material injecting in a mold for forming an interior hollow layer formed between an outer layer and an inner layer and filled with a gas or liquid colored or not colored or with shining small matters for beau-tifying a container.

Another feature of the invention is an injecting hole formed in a bottom of a female mold for injecting material into a hollow gap formed between the female mold and a male mold.

Another feature of the invention is one step of its manufacturing method, wherein a whole wall is formed to have thickness 2–3 times thicker than an outer layer wall for forming a passageway for inertia gas shot in the material injected first to expand to urge the material to be formed into a container, with a hollow layer slso formed between an inner layer and the outer layer and functioning to insulate heat.

BRIEF DESCRIPTION OF DRAWINGS

The invention will be better understoody by reference to reference to the accompanying drawings, wherein.

DETAILED DESCRIPTION OF THE PREFERRED EMBODIMENTS

Figure 1:
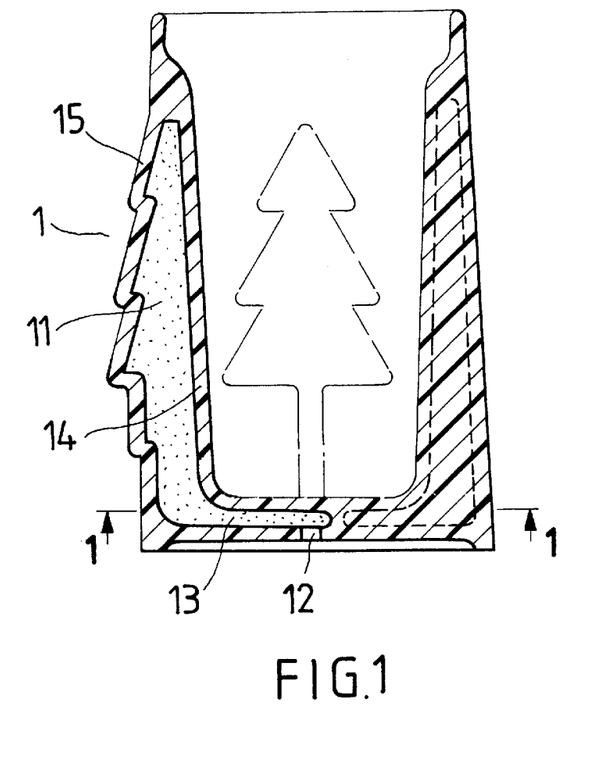
FIG. 1 is a cross-sectional view of a first preferred embodiment of a container in the present invention.

A first preferred embodiment of a container in the present invention, as shown in the present invention, as shown in FIG. 1, includes a body 1 of a preset shape, an interior hollow chamber 11 formed between an outer layer and an inner layer, an injecting hole 12 formed in a center portion of a bottom and a passageway 13 connecting the injection hole 12 and the interior hollow chamber 11.

In forming the container, an inertia gas is also shot into a mold a little after material is injected, flowing along a rather thick wall of the body 1 and becoming the interior hollow chamber 11. And a projecting shape can be formed on an outer surface. Two or more passageways 13 also can be formed to communicate with the interior hollow chamber 11 not connected with each other, and filled with gas or liquid of different colors and fine shiny decorative bits mixed therein.

The manufacturing method in the present invention includes a number of steps to be described below.

Figure 6:
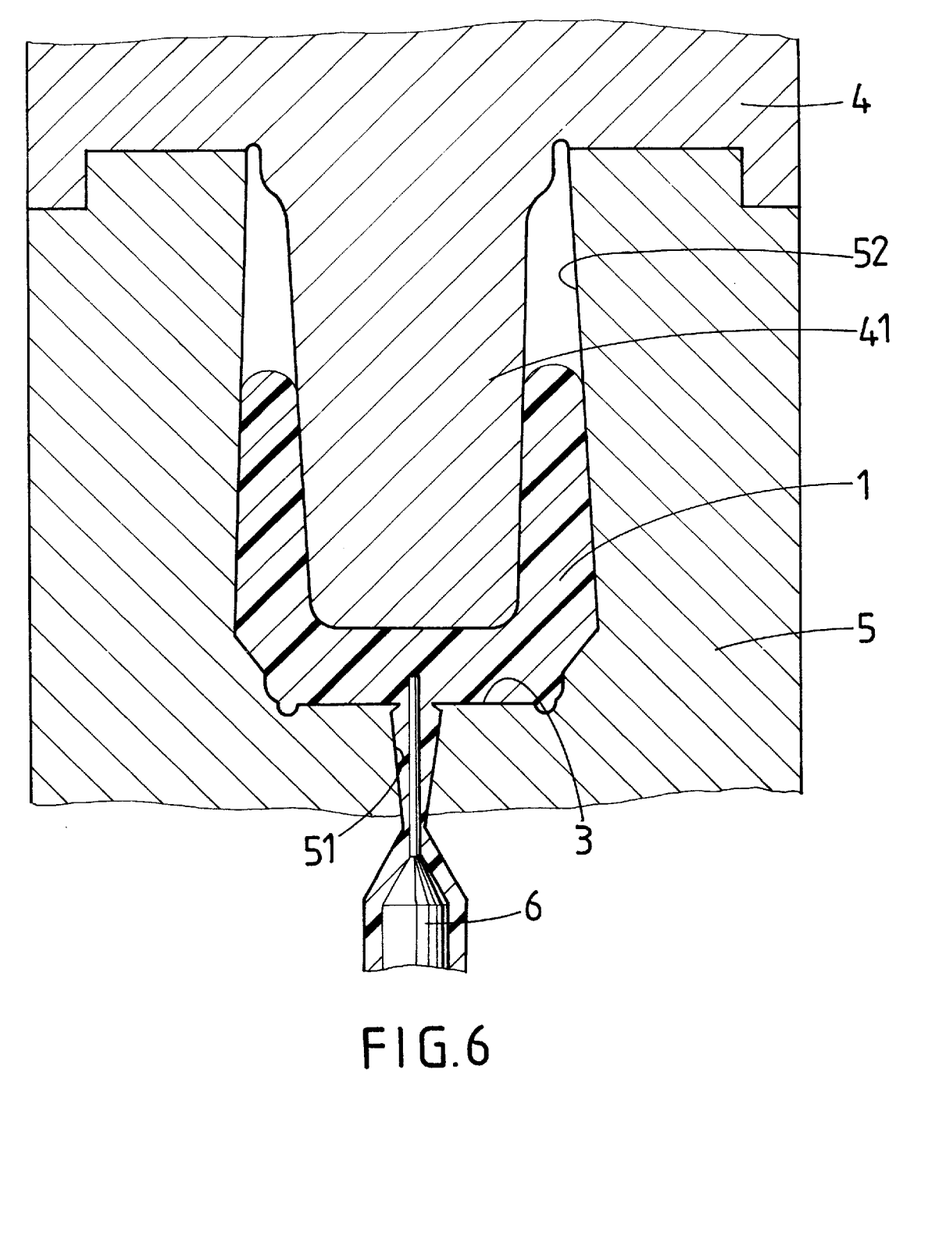
FIG. 6 is a cross-sectional view of a mold with material being injected in manufacturing the container in the present invention.

1. Preparing a mold. A mold for shaping a container has to be prepared, consisting of a female mold 5 and a male mold 4. The gap between the male mold and the female mold for forming the whole wall of the inner wall, the hollow chamber and the outer wall of a container is made two to three times thicker than the outer wall to be formed.

Figure 9:
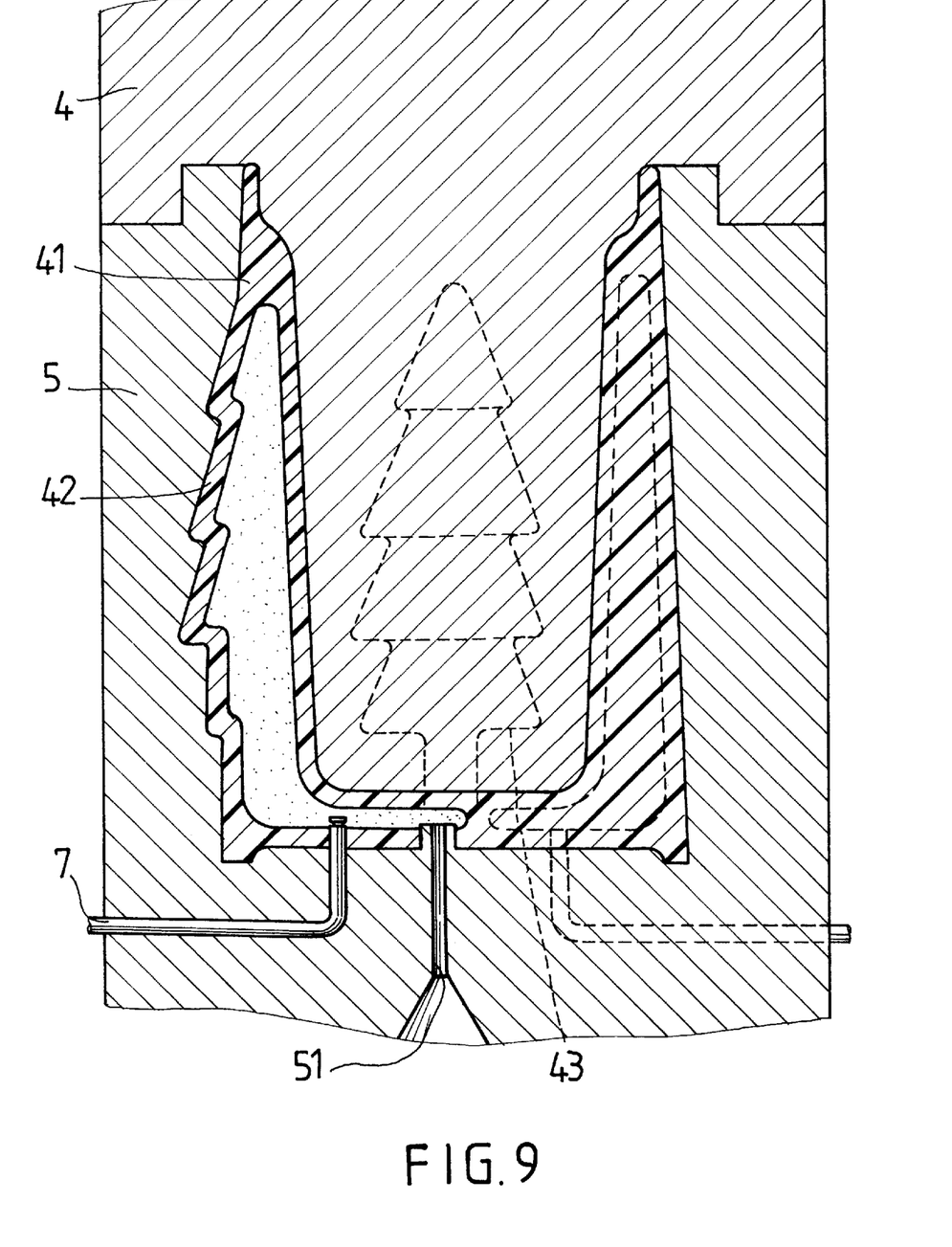
FIG. 9 is a cross-sectional view of a second preferred embodiment of a container manufactured in the present invention.

2. Forming an air mouth. The female mold 5 is provided with a material injecting hole 51 in a bottom 3, and an air valve 6 is inserted in the injecting hole 51 for shooting inertia gas through the hole 51 into the mold. Or a plurality of air valve guide needles 7 are spaced apart in the bottom as shown in FIG. 9, sloped in a proper angle to suit to the air passageway.

3. Injecting process. Material (heat plastic or heat hardening polymer) is injected into the mold through the injecting hole 51 for shaping a container.

Figure 7:
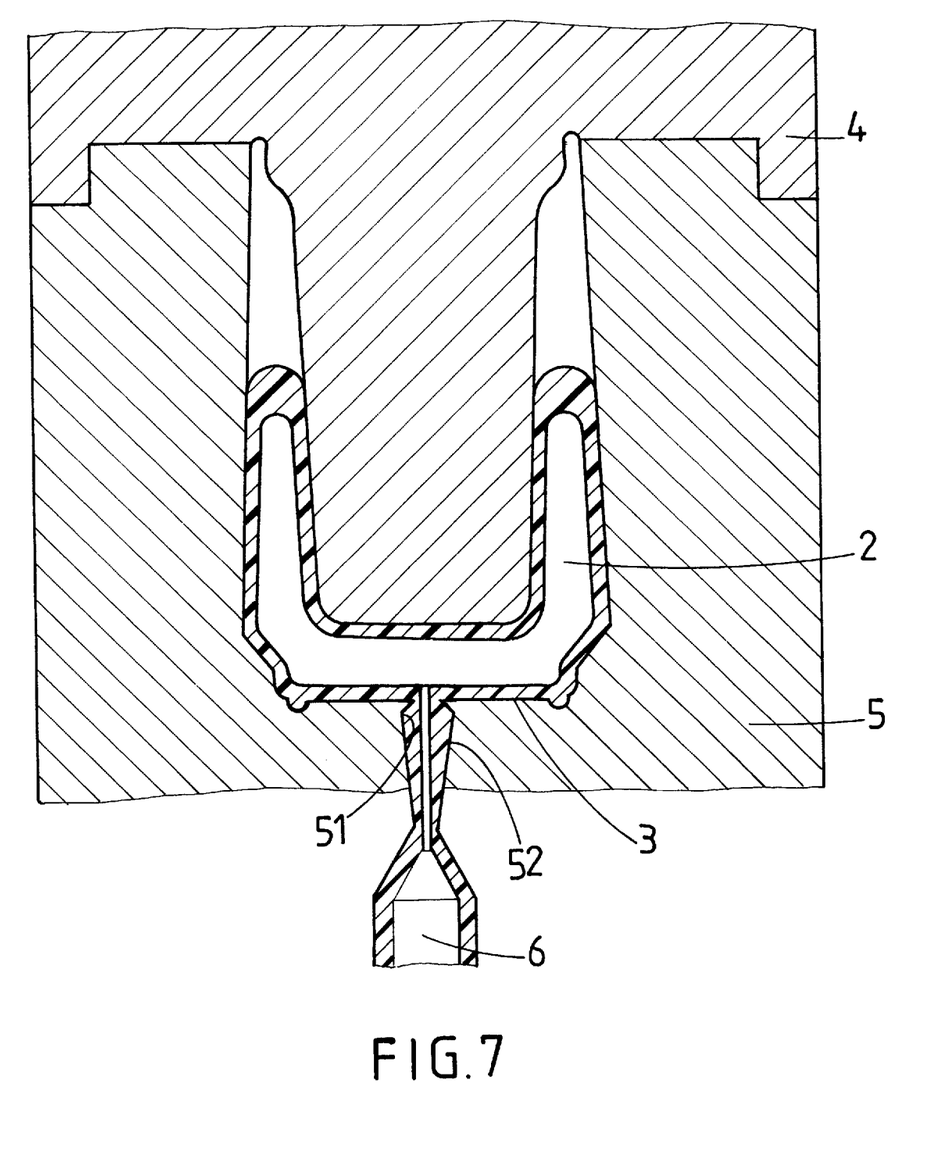
FIG. 7 is a cross-sectional view of air shot in the material being injected in the mold in manufacturing the container in the present invention.
Figure 8:
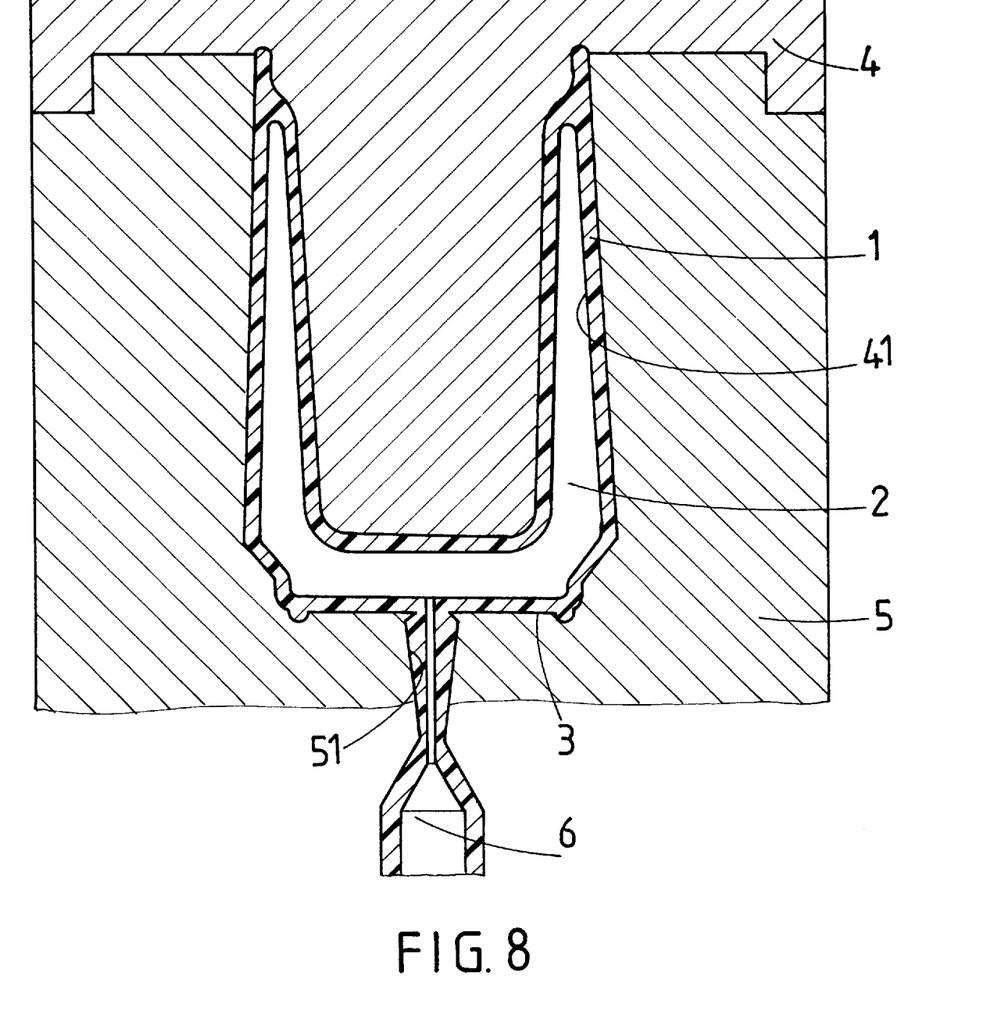
FIG. 8 is a cross-sectional view of an interior hollow layer formed in the material injected in the mold in manufacturing the container in the present invention.

4. Forming an interior hollow chamber. A gas is shot through the air valve 6 (or through the valve guide needles 7) in the material injected in the mold a little after the material is injected therein, as shown in FIG. 7, for forming an interior hollow in the material as shown in FIG. 8. Then the material filled with the gas is cooled properly. In other words, in a first stage material is injected in the mold and the gas is shot in the material in the mold, and in a second stage the gas is filled saturated in the material, which is urged by the gas to be formed into a container shape and then to be cooled off properly.

5. Opening the mold. The mold is to be opened for a cooled finished container in the mold taken out and the injecting mouth is to be removed.

6. Sealing the injecting mouth. The injecting mouth is to be sealed to form an interior hollow layer (chamber) for insulating heat; or a liquid refrigerant is filled in the interior hollow layer, or the interior hollow layer is vacuumed, and then the injecting mouth is sealed up to become a cool preserving container or a container with a vacuum heat insulating function.

Referring to FIG. 9, a container is provided with a partial outer surface shaped like a zigzag, made by shooting gas through a guide needle into material first injected in the mold.

Figure 2:
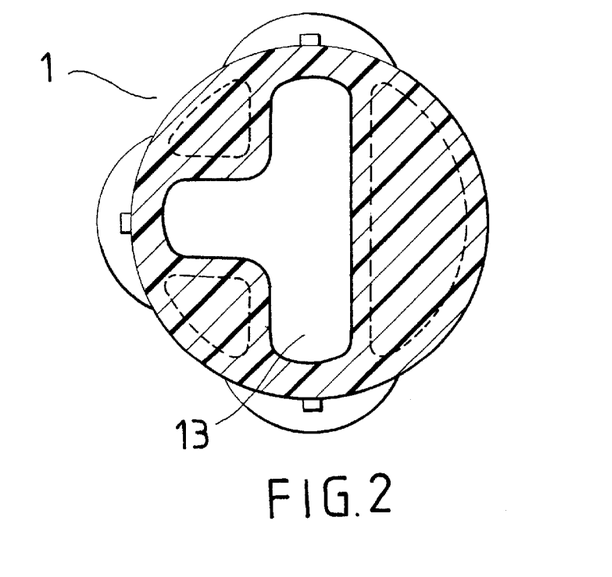
FIG. 2 is a cross-sectional view of line 1—1 in FIG. 1.
Figure 3:
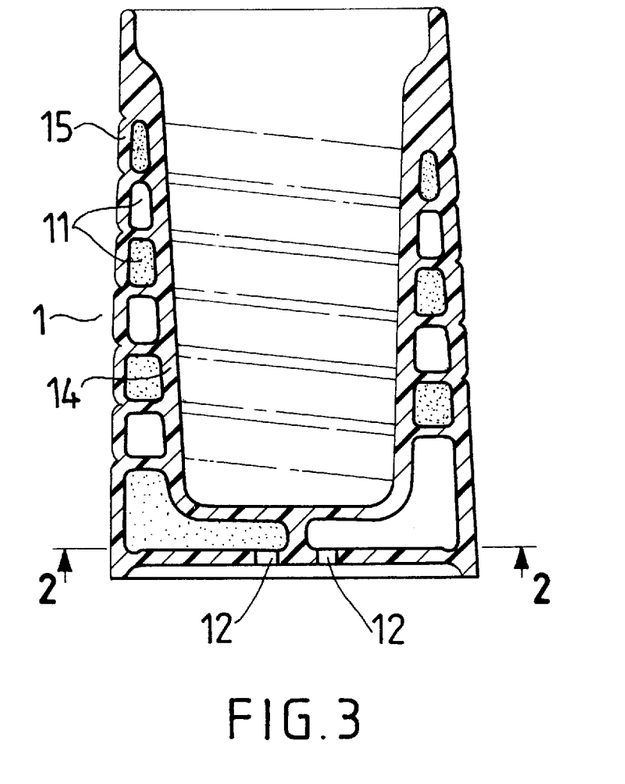
FIG. 3 is a second preferred embodiment of a container in the present invention.
Figure 4:
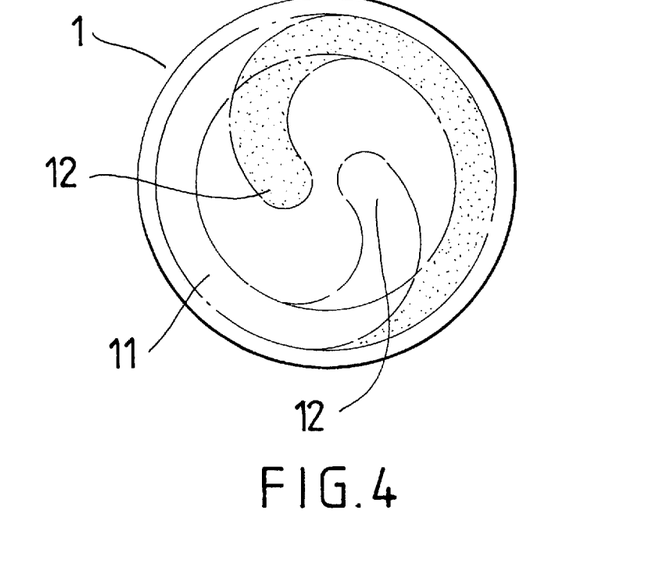
FIG. 4 is a cross-sectional view of line 2—2 in FIG. 3.
Figure 5:
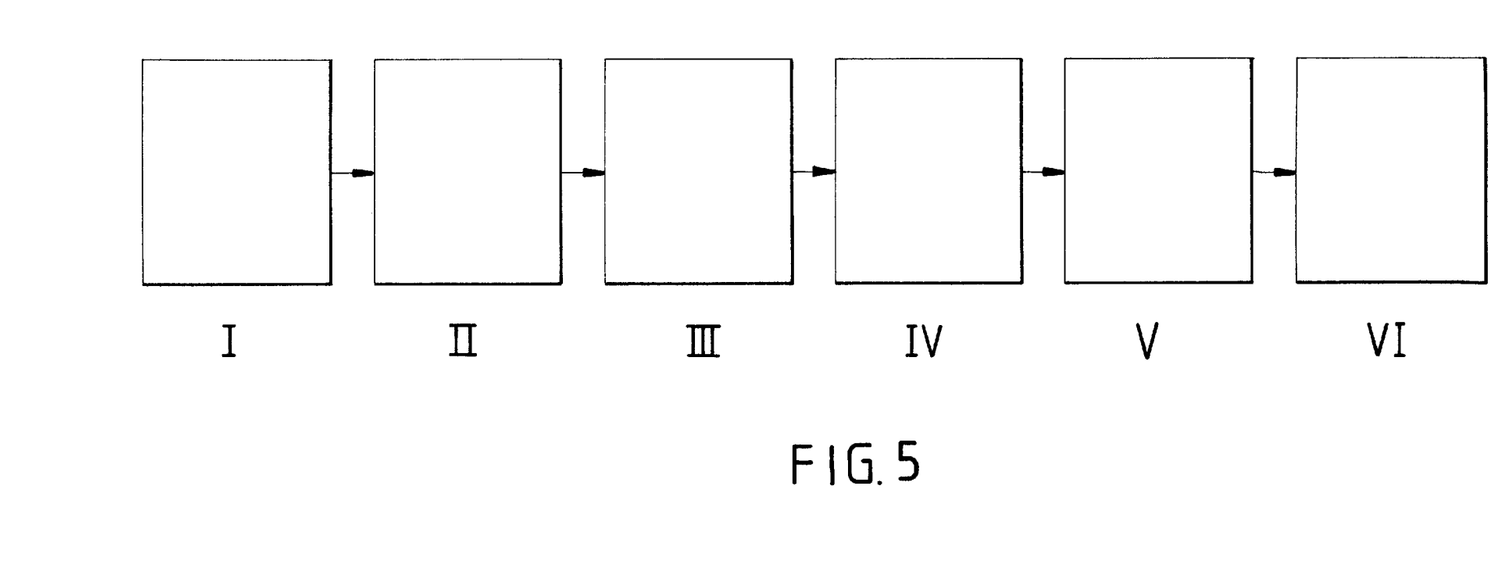
FIG. 5 is a flowing chart of a manufacturing method for the container in the present invention.

In a combining practice in the invention, when a liquid or a decorative matter is injected through the injecting hole 12 into the interior hollow chamber 11, a proper colored liquid may also be injected through the passageway 13 into the chamber 11 according to its shape. Then the injecting hole 12 may be sealed up by means of high frequency technique. Further, a container can be formed with a plurality of small chambers 11 communicating or not communicating with each other, and if small chambers 11 are not communicated with each other, as shown in FIG. 3, the same number of injecting holes 12 as the chambers 11 have to be formed in the bottom of the body 1 as shown in FIG. 2. Moreover, a colored liquid may be injected in the chambers 11 depending on the shape of the chambers 11. Besides, the chamber 11 may be made as a conventional one shown in FIG. 10. Many kinds of shapes of containers can be made according to the manufacturing method.

In addition, an outer surface of the body 1 can be formed with a projecting design, enabling a container used as a decoration.

While the preferred embodiments of the invention has been described above, it will be recognized and understood that various modifications may be made therein and the appended claims are intended to cover all such modifications which may fall within the spirit and scope of the invention.

What is claimed is:

1. A method of fabricating a container having an inner and outer walls comprising the steps of:

(a) establishing a mold assembly including a female mold having a cavity portion defined therein and a male mold having a projecting portion defined therein;

(b) locating said projecting portion of said male mold to extending substantially into said cavity portion of said female mold, said male and female molds defining therebetween at least one inner gap of predetermined contour and dimension;

(c) forming for each said inner gap one injection hole extending through said mold assembly, said injection hole being in open communication with said inner gap;

(d) injecting a fluid material through said injection hole into said inner gap;

(e) injecting a gas into said gap for distributing said fluid material therein to form an interior hollow chamber substantially enclosed by said fluid material;

(f) substantially solidifying said fluid material to form a container;

(g) sealing said injection hole to enclose said interior hollow chamber within said container in substantially airtight manner.

2. The method as recited in claim 1 wherein said step (f) includes the step of cooling said fluid material.

3. The method as recited in claim 1 wherein said step (b) includes the step of establishing said predetermined dimension of said inner gap to remain within the approximate range of 2 to 3 times the thickness of the outer wall of the container to be fabricated.

4. The method as recited in claim 3 wherein said step (d) includes the step of injecting a thermoplastic composition.

5. The method as recited in claim 3 wherein said step (d) includes the step of injecting a heat hardening polymer composition.

6. The method as recited in claim 3 wherein said step (g) is preceded by the step of evacuating said hollow chamber.

7. The method as recited in claim 3 wherein said step (g) is preceded by the step of injecting a refrigerant into said hollow chamber through said injection hole.

* * * * *